US008686920B2

(12) United States Patent
Sarabandi et al.

(10) Patent No.: US 8,686,920 B2
(45) Date of Patent: Apr. 1, 2014

(54) MINIATURIZED RADIO REPEATER

(75) Inventors: Kamal Sarabandi, Ann Arbor, MI (US); Young Jun Song, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 373 days.

(21) Appl. No.: 13/115,377

(22) Filed: May 25, 2011

(65) Prior Publication Data

US 2012/0190296 A1    Jul. 26, 2012

Related U.S. Application Data

(60) Provisional application No. 61/349,236, filed on May 28, 2010.

(51) Int. Cl.
*H01Q 21/00* (2006.01)
*H04B 7/14* (2006.01)
*H04B 3/36* (2006.01)

(52) U.S. Cl.
USPC ............................. 343/893; 370/279; 370/293

(58) Field of Classification Search
USPC .......................................................... 343/893
See application file for complete search history.

(56) References Cited

U.S. PATENT DOCUMENTS

| | | | | |
|---|---|---|---|---|
| 6,934,511 | B1 * | 8/2005 | Lovinggood et al. | 455/11.1 |
| 2004/0160376 | A1 * | 8/2004 | Hornsby et al. | 343/770 |
| 2005/0085200 | A1 * | 4/2005 | Toncich | 455/121 |
| 2005/0237267 | A1 * | 10/2005 | Brown et al. | 343/909 |
| 2006/0205343 | A1 * | 9/2006 | Runyon et al. | 455/11.1 |
| 2010/0080151 | A1 * | 4/2010 | Proctor et al. | 370/279 |

OTHER PUBLICATIONS

Hong et al. ("Low-Profile, Multi-Element, Miniaturized Monopole Antenna" IEEE Trans. on Antennas and Propag. vol. 57, Issue 1, Jan. 2009, pp. 72-80).*
Mosallaei et al. ("Design and Modeling of Patch Antenna Printed on Magneto-Dielectric Embedded-Circuit Metasubstrate" IEEE Trans. on Antennas and Propag. col. 55, No. 1; Jan. 2007. pp. 45-52).*
Lee et al. ("A Radio Repeater Interference Cancellation Model for Mobile Communication Systems" The Fourth International Conference on Wireless and Mobile Communications, 2008. ICWMC '08. Jul. 27-Aug. 1, 2008. pp. 376-381).*
Slingsby et al "Antenna Isolation Measurements for on-frequency Radio Repeaters" IEE Antennas and Propag. Conference Pub. No. 407, Apr. 4-7, 1995, pp. 239-243.*
Song et al "Suppression of the Mutual Coupling Between Two Adjacent Miniaturized Antennas Utilizing Printed Resonant Circuits," Antennas and Propagation Society International Symposium, 2009, IEEE Jun. 2, 2009.
Buell et al "Metamaterial Insulator Enabled Superdirective Array," IEEE Transactions on Antennas and Propagation, vol. 55, No. 4 Apr. 4, 2007.

* cited by examiner

*Primary Examiner* — Jerome Jackson, Jr.
*Assistant Examiner* — Ricardo Magallanes
(74) *Attorney, Agent, or Firm* — Harness, Dickey & Pierce, P.L.C.

(57) ABSTRACT

A radio repeater system is provided that utilizes miniaturized antennas and a meta-material channel isolator. The radio repeater is comprised of: a receive antenna configured to receive a signal at a desired channel frequency; a transmit antenna configured to transmit the signal at the channel frequency; an amplifier electrically connected between the receive antenna and the transmit antenna; and an array of resonating circuits disposed spatially between the receive antenna and the transmit antenna. Each resonating circuit is designed to resonant at the channel frequency and thereby suppress propagation of surface waves between the antennas.

23 Claims, 14 Drawing Sheets

MINIATURIZED RADIO REPEATER

CROSS-REFERENCE TO RELATED APPLICATIONS

This application claims the benefit of U.S. Provisional Application No. 61/349,236, filed on May 28, 2010. The entire disclosure of the above application is incorporated herein by reference.

GOVERNMENT CLAUSE

This invention was made with government support under grant number W911NF-08-2-2004 awarded by the US Army Research Laboratory. The government has certain rights in this invention.

FIELD

The present disclosure relates to a sub-wavelength size radio repeater system utilizing miniaturized antennas and a meta-material channel isolator.

BACKGROUND

For wireless network systems, the path-loss between the transmitter and receiver is a critical factor that determines the possible range of communication between two nodes. Complex environments such as urban canyons and building interiors often contain numerous obstacles that impede the Line-Of-Sight (LOS) communication and increase the path-loss. The existing long range ad-hoc communication network relies on multi-path (multiple reflection, diffraction, and penetration through obstacles). In these environments especially at high frequencies the path-loss dramatically increases, which often requires higher transmitter power and closely spaced communication nodes. Furthermore, as transmitter power increases or as transmitting nodes become closer, the potential for mutual interference between communication cells increases which, if present, can cause degradation in coverage capacity. Additionally, a topology that uses closely spaced nodes will be more expensive than a similar topology sparsely populated with nodes. To overcome these situations and to help improve the ground area coverage of communication signals without increasing the transmitter power, radio repeaters have been extensively used in various application scenarios. Numerous studies regarding feasibility and operation of the radio repeater have been presented.

Additionally, numerous commercial products utilizing the concept of the radio repeater have been introduced and fabricated. The main objective of the radio repeater in these scenarios is to achieve enhanced connectivity by amplifying a radio signal through an active device as shown in FIG. 1. For the downlink communication, from a base station to an end-node/unit, the signal originating at the base station is linked through the receive antenna (RX) of repeater, amplified, and re-transmitted through the transmit antenna (TX), and vice versa for the uplink direction. However, the mutual coupling between a repeater's RX and TX antennas generates a positive feedback loop as shown in FIG. 1. When the gain of the RF amplifier is greater than the isolation level of the RX and TX antennas, the overall system will start to oscillate, and the communication coverage of that microcell cannot be established. Thus, the level of mutual coupling limits the performance of a radio repeater as well as the dimension and cost of the overall system.

To circumvent this intrinsic problem, generally two approaches have been proposed. The first method is to divide the frequencies of the uplink and downlink signals. This methodology utilizes Frequency Division Duplex (FDD) to reduce the mutual coupling by separating signal frequencies. However, it requires complex circuitry, larger size, and a common protocol to manage frequency allocation, which implies a higher cost and much more power consumption. The second method is to adapt the Time Division Duplex (TDD) in time domain. This also introduces additional logic circuitry, latency, and knowledge of the repeater, transmitter and receiver locations.

Therefore, it is desirable to develop an improved radio repeater designed to overcome the adverse effect of various complex environments by reducing the path-loss. This section provides background information related to the present disclosure which is not necessarily prior art.

SUMMARY

An improved radio repeater is set forth in this disclosure. The radio repeater is comprised of: a receive antenna configured to receive a signal at a desired channel frequency; a transmit antenna configured to transmit the signal at the channel frequency; an amplifier electrically connected between the receive antenna and the transmit antenna; and an array of resonating circuits disposed spatially between the receive antenna and the transmit antenna. Each resonating circuit is designed to resonant at the channel frequency and thereby suppress propagation of substrate mode between the antennas.

Each resonating circuit may be implemented by an interdigital capacitor disposed on the surface of the substrate and an inductor formed by a pair of conductive pins embedded vertically into the substrate and electrically coupled to different terminals of the capacitor.

The radio repeater may further include a pair of chokes disposed at opposing ends of an underside surface of the ground plane. Each choke operates to suppress an induced current traversing on the back of the ground plane.

In another aspect of this disclosure, a symmetric design for radio repeater can be used to mutually isolate the antennas. In this design, a pair of low-profile miniaturized transmit antennas are fabricated on the top surface of the substrate at opposing ends thereof and spaced apart from each other at a distance equal to one half of a wavelength of a signal at the desired operating frequency. A low-profile miniaturized receive antenna is also fabricated on the top surface of the substrate and disposed at a location in the middle of the transmit antennas. A coupling circuit electrically couples the receive antenna to the pair of transmit antennas. The coupling circuit is configured to receive a signal from the receive antenna and supply a transmit signal to each of the transmit antenna such that the transmit signals having same magnitude but a phase difference of 180 degrees.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

Figure 1:
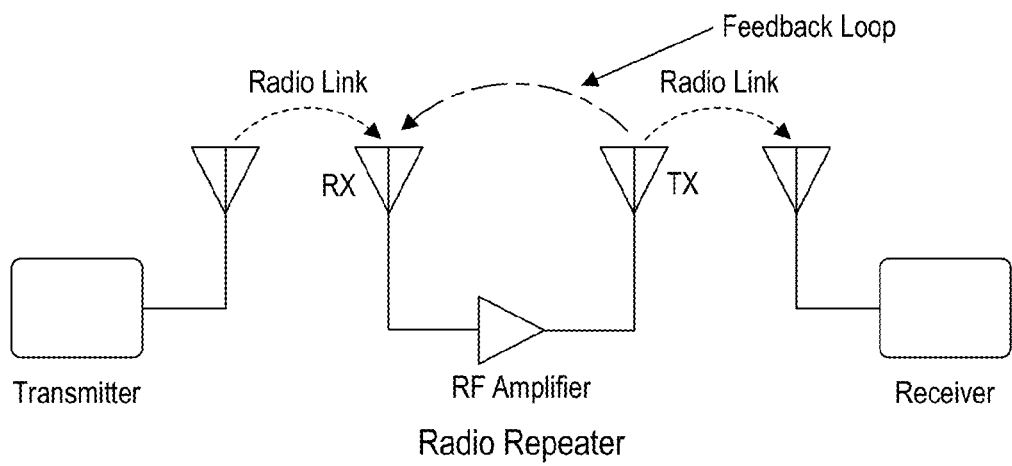
FIG. 1 is a diagram illustrating a radio link that uses a radio repeater.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

FIGS. 2A and 2B depict an exemplary radio repeater 20 in accordance with this disclosure. The radio repeater 20 is comprised of two miniaturized planar or low-profile antennas 22, 23 fabricated onto a top surface of a dielectric substrate 24. More specifically, a receive antenna 22 is configured to receive a signal at a desired channel frequency and a transmit antenna 23 is configured to transmit the signal at the channel frequency. In an exemplary embodiment, the small radio repeater occupies a very small area ($0.07/\lambda_0^2$) with a very short height ($\lambda_0/70$) without its active circuitry. This exemplary configuration is shown to boost the power level of the received signal by 28 dB.

To achieve the compact dimension of the radio repeater, a channel isolator 25 is also disposed spatially between the two antennas 22, 23. By generating the normal magnetic field along the signal path between receive antenna 22 and the transmit antenna 23, artificial magnetic walls are generated that serve to suppress the electromagnetic wave propagation between receive and transmit antennas as will be further described below.

The radio repeater 20 further includes an active RF amplification circuit 28 and a battery 29 integrated into the repeater platform. The amplifier 28 is electrically connected between the receive antenna 22 and the transmit antenna 23 and operates to amplify the received signal. In an exemplary embodiment, the amplifier circuitry 28 and the battery 29 are attached to the back of a secondary substrate 27. To assembly, the secondary substrate 27 is flipped over and attached to the bottom of the primary substrate 24. Other types of components and configurations for the components of the radio repeater are within the broader aspects of this disclosure.

In an exemplary embodiment, the two miniaturized low-profile antennas 22, 23 are capable of supporting an omni-directional pattern and vertical polarization. Since the receive and transmit antennas of the proposed repeater shows omni-directionality over the H plane, the uplink and downlink signal paths can be established through a single circuit path. This can reduce complexity and power consumption of the RF amplifier circuitry 28. In addition, pure vertical polarization allows for suppression of the substrate mode as well as a decreased path-loss along the channel. It is well understood that for near-earth wave propagation scenarios vertically polarized waves experience much less path-loss as compared to horizontally polarized waves.

According to antenna theory, the intensity and polarization of the radiated field is proportional to the level and direction of the current distribution over the antenna. In many practical miniaturized antennas, the level of the excited current is limited by the impedance mismatch between the feeding network and the antenna itself. To achieve a low-profile miniaturized antenna, a quarter-wave microstrip resonator fed near the short-circuited end is used. To achieve miniaturization and impedance matching a four-arm spiral shape quarter-wave resonator structure may be utilized. Although a good input reflection coefficient $S_{11}$ response at the frequency of operation can be obtained, this antenna requires two layers: an upper layer consisting of the open-ended spiral shape line, and a lower layer consisting of the short-circuited transmission line for the matching network to radiate the power effectively. This physical structure increases complexity and cost for fabrication as well as any misalignment between the two layers can shift the operation frequency.

Figure 3A:
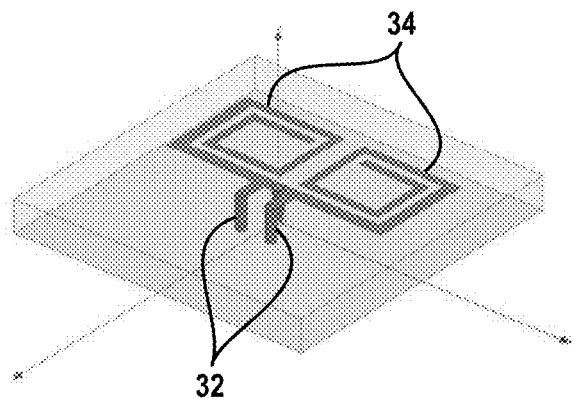
FIG. 3A is a perspective view depicting an exemplary topology for a miniaturized multi-elements monopole antenna (MMA)

An alternative approach is to place the matching network at the same layer of the miniaturized antenna as shown in FIG. 3. Although the main radiation is from the shorted pins 32, some radiation is emanated from the spiral arms 34. The polarization of the radiated field from the spiral arms 34 is horizontal. The four spiral arms are placed in a symmetrical manner in order to minimize horizontally polarized radiated field. Symmetry of these arms is essential to cancel such radiated fields and eventually achieve an omni-directional vertically polarized radiation pattern. In addition, symmetry and close spacing (1.56 mm≈$\lambda_0/70$) of the shorting pins enable the excited currents through these pins to be in-phase. The short circuited current that passes through the four vertical pins are the dominant radiating elements and responsible for the vertically polarized radiated field. The optimized miniaturized multi-elements monopole antenna (MMA) may be designed using a commercial finite element method solver (e.g., Ansoft's HFSS ver. 11.1). In addition, the transmission line based antenna can be fabricated using standard printed circuit technologies. This serves to reduce the alignment error observed in the multi-layer design, and hence the fabrication process and the discrepancy between the simulation and measurement are reduced significantly. While the following description is provided with reference to a particular antenna configuration, it is readily understood that broader aspects of the disclosure, including the unique channel isolator, are applicable to other types of planar antennas.

Figure 3B:
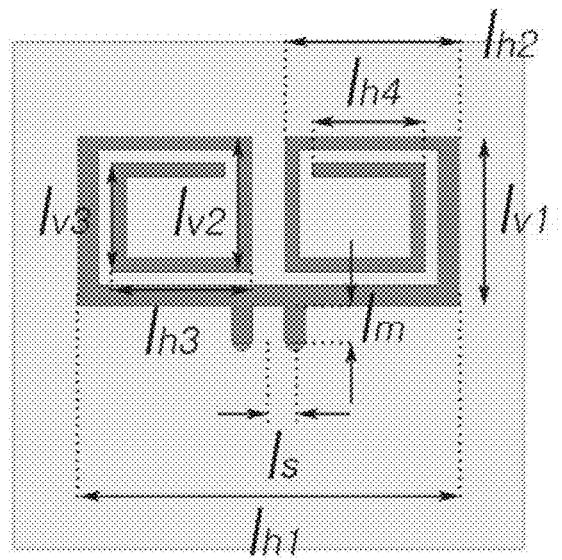
FIG. 3B is a top view depicting the topology for the MMA.

To be incorporated into the radio repeater, the optimized MMA may be further modified to achieve smaller dimensions. Because of the sub-wavelength dimension of the proposed radio repeater, a pair of the optimized MMA can produce a high level of mutual coupling within the small ground plane. Thus, the objective is to modify the MMA geometry so that mutual coupling can be reduced while maintaining the polarization purity and the desired radiation pattern. By utilizing only two arms of the MMA with a symmetric topology as shown in FIG. 3B, the horizontal current cancellation and reduction of mutual coupling can be achieved at the expense of an asymmetric radiation pattern in the E plane.

In an exemplary embodiment, physical dimensions are optimized for operation around 2.5 GHz and summarized in the following table.

| $l_{h1}$ | $l_{h2}$ | $l_{h3}$ | $l_{h4}$ | $l_{v1}$ | $l_{v2}$ |
|---|---|---|---|---|---|
| 11.20 mm | 5.10 mm | 4.10 mm | 3.30 mm | 5.0 mm | 4.00 mm |
| $l_{v3}$ | | $l_m$ | | $l_s$ | |
| 3.20 mm | | 1.10 mm | | 0.78 mm | |

Figure 4A:
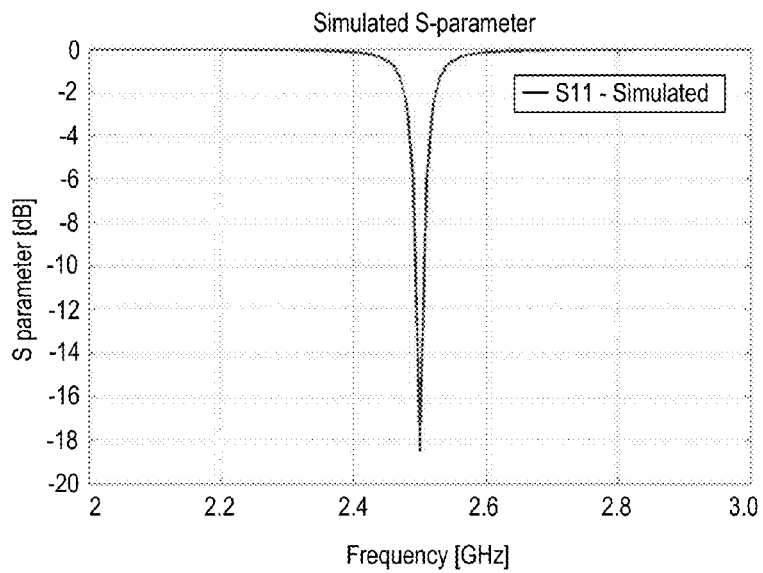
FIG. 4A is graph illustrating a simulated S-parameter for the MMA.
Figure 4B:
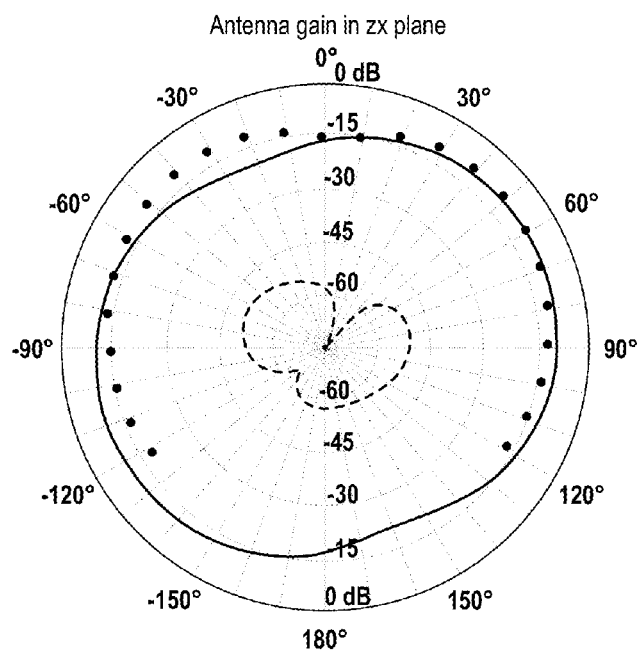
FIG. 4B-4D are graphs illustrating simulated radiation patterns on the E(zx) plane, E(yz) plane and H(xy) plane, respectively, for the modified MMA.
Figure 4C:
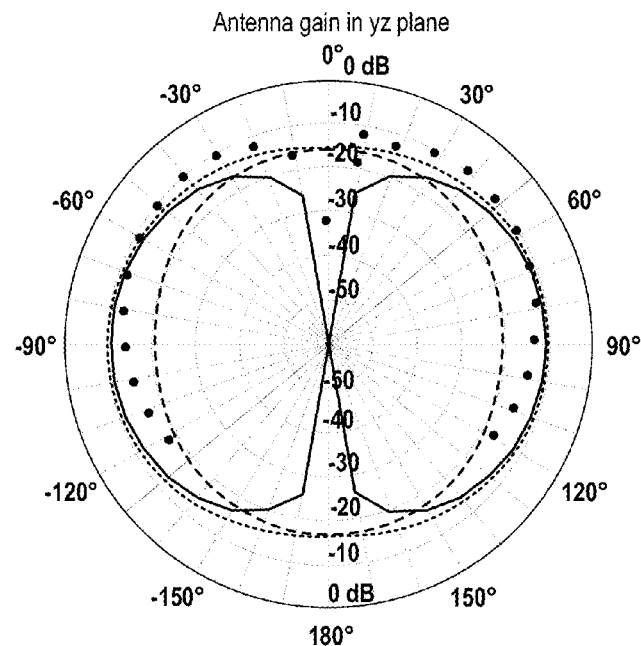
Figure 4D:
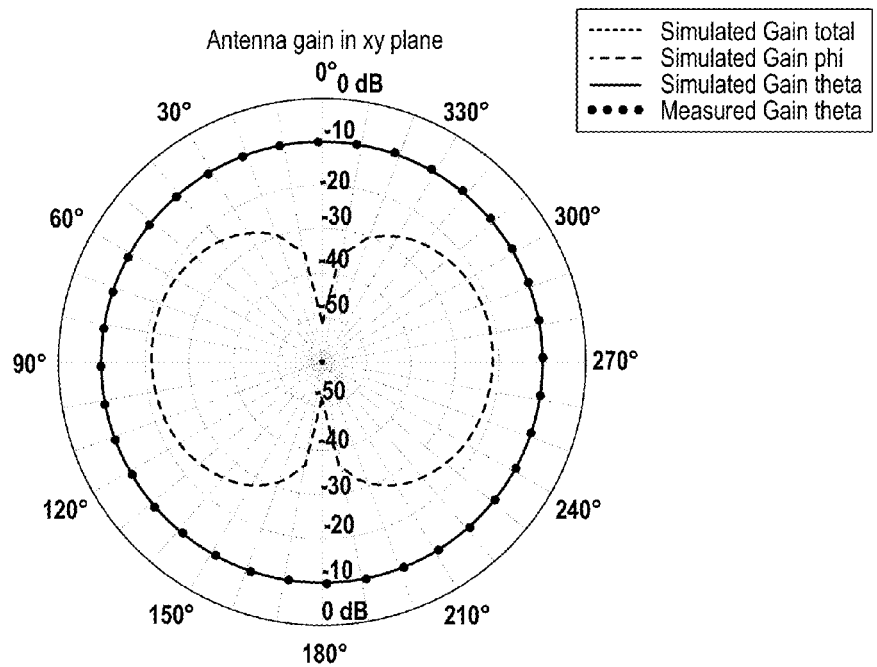

All line length and spacing (between traces) values are set to 0.4 mm, except for Ih1, Iv1 and Im which are set to 0.6 mm. FIG. 4A presents the simulated input reflection coefficient of the modified MMA. As can be seen, the modified MMA shows a −18.5 dB of input reflection coefficient at the design frequency. The simulated radiation pattern of the modified MMA is shown in FIGS. 4C, 4D and 4E. The vertical polarization in the H-plane shows an omni-directional pattern, similar to that of a monopole. In addition, the level of the horizontal polarization in the H-plane is negligible compared to the vertical polarization, which implies that the cancellation between horizontal electric current is achieved effectively.

In practical antenna systems, the mutual coupling between adjacent antennas restricts compact integration of multiple antennas in a small area for applications such as multiple input and multiple output (MIMO) communication systems. To suppress the mutual coupling, various approaches have been studied. For example, one method is to engineer the electric and magnetic properties of the material, such as the permittivity and permeability by introducing an artificial structure. Thus, a mushroom-like structure can suppress the mutual coupling by introducing a negative refractive index. The artificial structure requires a large physical dimension, and the meta-material insulator causes fabrication complexity and cost.

Figure 2:
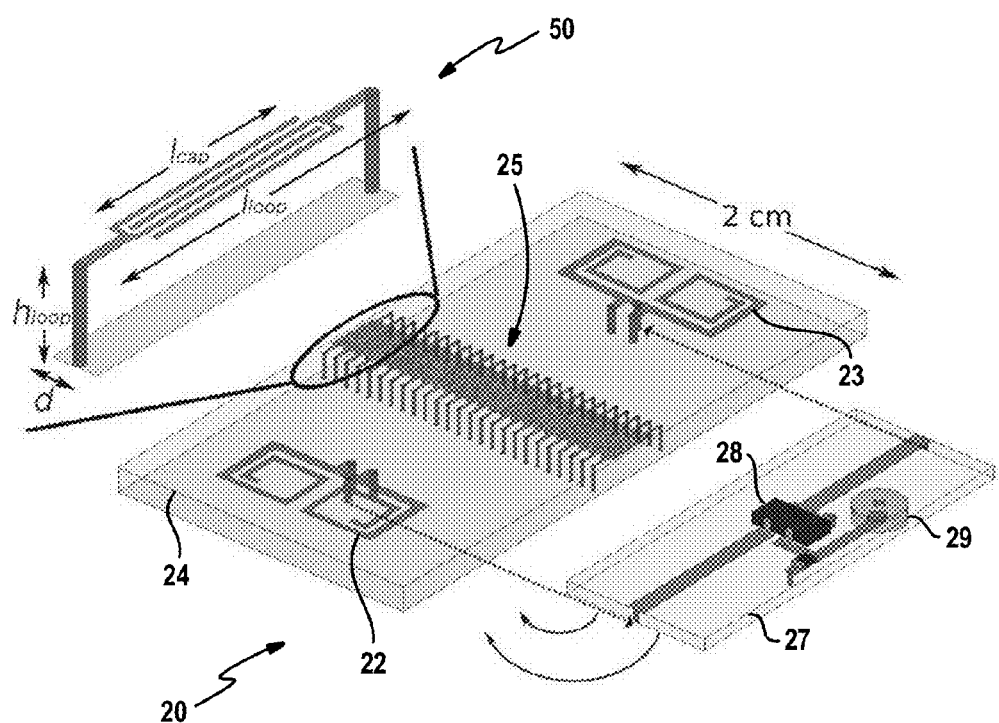
FIG. 2 is a perspective view of an exemplary radio repeater in accordance with this disclosure.

To address these limitations, a meta-material based channel isolator 25 may be disposed spatially between the two antennas as shown in FIG. 2. In an exemplary embodiment, the channel isolator 25 is comprised of an array of isolating elements, where each isolator element 50 is designed to resonate at the desired channel frequency and decrease the mutual coupling by suppression of the surface waves in the substrate generated by the vertical pins of the MMA. The vertical pins create a transverse magnetic (TM) wave in the substrate with zero cutoff frequency. The magnetic field is parallel to the ground plane and perpendicular to the pins. To inhibit propagation of the TM surface wave (substrate mode), an electromagnetic band-gap (EBG) metal-material layer can be utilized. The advantage of the band-gap material is that it creates an equivalent open circuit to the surface wave as opposed to a short-circuit that a metallic wall can produce.

Figure 5A:
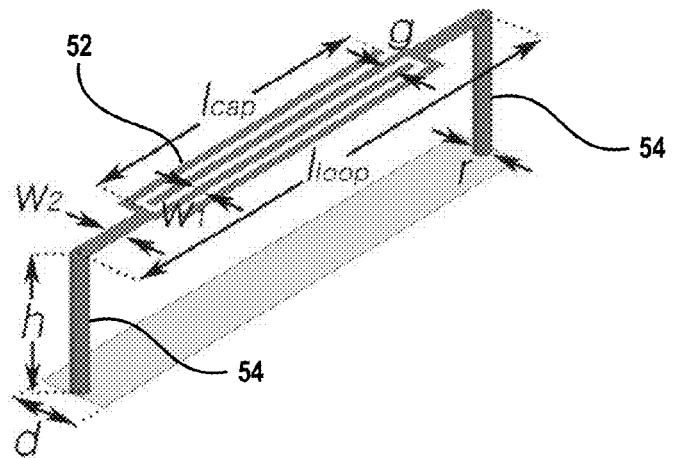
FIGS. 5A and 5B are diagrams illustrating an exemplary construct for an isolator element.

Referring to FIG. 5A, the array of isolating elements may be further defined as parallel LC resonant circuits that are magnetically coupled with the substrate mode. More specifically, each isolating element 50 may be comprised of an interdigital capacitor 52 disposed on the surface of the substrate 24 and an inductor formed by a pair of conductive pins 54 embedded vertically into the substrate 24 and electrically coupled to different terminals of the capacitor. While the description above has been provided with reference to a particular circuit arrangement, other circuit arrangements fall within the scope of the disclosure.

Figure 5B:
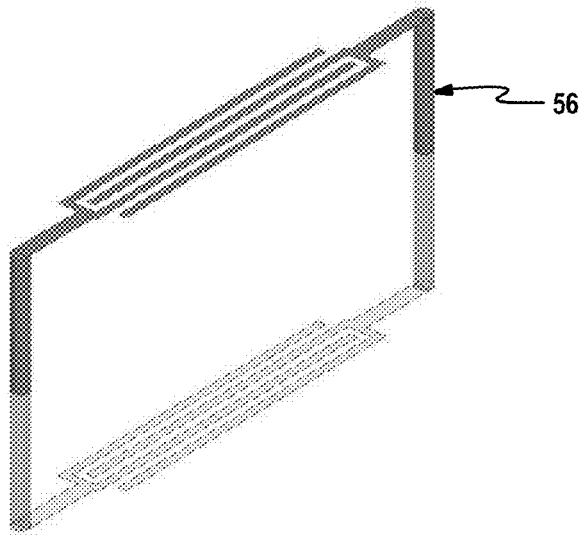

When each loop is imaged, a larger loop 56 having a larger inductance and a smaller capacitance is formed using image theory as shown in FIG. 5B. Assuming the fundamental mode propagates from the TX antenna 23 to the RX antenna 22 through the substrate 24, the horizontally polarized magnetic field linked by the square loop induces an electric current on the vertical wires. In addition, this induced current generates a magnetic field which is perpendicular to the loop. When the unit cells are closely spaced to each other, the inductance of the loops is increased and the periodic array acts like a solenoid. At resonance, the periodic layer acts as a perfect magnetic conductor (PMC) plane. Due to the mutual coupling of the adjacent loops, the self inductance of the square loop as shown in FIG. 5B can be obtained from $$L_s = d \frac{\mu_r \mu_0 A_{loop}}{d} \quad (1)$$

where $\lambda_{loop} = h \cdot l_{loop}$ is the internal area of the loop and d is the periodicity of unit cells.

The quality factor (Q) of the equivalent single pole isolator affects the performance and isolation bandwidth. Thus, commercial lumped capacitors with finite deviation of capacitance values and low Q factor will cause the suppression of the mutual coupling to deteriorate. To simultaneously reduce the deviation of these values, improve the Q factor, and lower the cost of fabrication, printed circuit technology can be utilized to implement the capacitors. As mentioned, the magnetic field induces the electric current on the vertical wires, and this current transforms to a displacement current (electric field) as it gets through the gaps between the fingers of the series interdigital capacitor. As most of the electric field between the metallic strips of this capacitor is in the gap and perpendicular to the metallic edges, its capacitance can be computed from the capacitance per unit length of two thin co-planar strips given by $$C = \frac{\varepsilon_r \varepsilon_0 K(\sqrt{1-g^2})}{K(g)} \quad (2)$$

$$k_i = \sin\left(\frac{\pi}{2}\eta\right) \text{ and } k_e = 2\frac{\sqrt{\eta}}{1+\eta} \quad (3)$$

where $\eta = \omega_1/(\omega_1+g)$ is the metallization ratio and K(k) is the complete elliptic integral of first kind defined by $$K(k) = \int_0^{\pi/2} \frac{d\phi}{\sqrt{1-k^2\sin^2\phi}} \quad (4)$$

Since the individual capacitors between fingers are connected in parallel, the total capacitance per unit length of interdigital capacitor is equal to $$C = (n-3)\frac{Ci}{2} + 2\frac{CiCe}{Ci+Ce} \text{ for } n > 3 \quad (5)$$

where $C_i$ is the capacitance between inner strips, $C_e$ is between outer and inner strips, and n is the number of fingers. Hence, the total capacitance of the proposed isolator can be calculated easily from $C_s = Cf_{cap}$, where $f_{cap}$ is the length of the fingers. The interdigital capacitor is centered between two vertical wires. The designed parameters are summarized in the table below.

| $l_{loop}$ | $l_{cap}$ | g | $w_1$ | $w_2$ |
|---|---|---|---|---|
| 6.25 mm | 3.84 mm | 0.10 mm | 0.10 mm | 0.20 mm |
| h | d | r | n | |
| 1.57 mm | 0.81 mm | 0.20 mm | 4 | |

The length and height of the unit cell are chosen to be 6.25 mm×1.57 mm. The corresponding inductance and capacitance of the unit cell are thus found to be 15.2132 nH and 0.1869 pF, respectively. Based on this calculation, the self resonant frequency is calculated to be 2.98 GHz.

Figure 6:
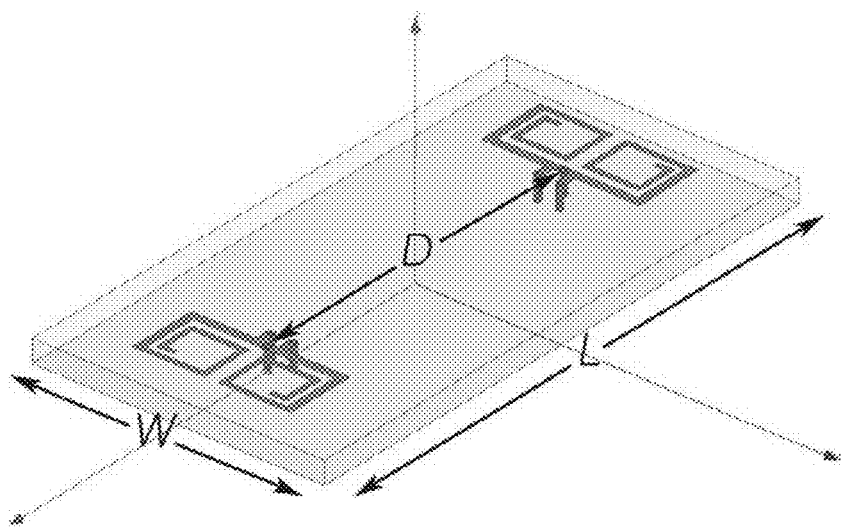
FIG. 6 is a perspective view of the exemplary repeater platform without a channel isolator.

The modified MMA with two symmetric arms and vertical pins was designed on a small ground plane and was shown to produce a very good impedance match and vertical polarization. This design may be further optimized to be integrated with the channel isolator as shown in FIG. 6. As mentioned before, two arms of the original MMAs that would come close to the meta-material isolator are removed. The magnetic field from these arms could have coupled to the isolator loops and established a link between the two antennas instead of isolating them. In a miniaturized antenna, the size of the ground plane can also affect the performance of the antenna. The edge currents on the ground plane affect the radiation pattern, directivity, and polarization. To maintain small physical dimensions, the design parameters for the optimized configuration include the position of the TX and RX antennas as well as the dimensions of the ground plane. The optimization is performed using HFSS to achieve impedance matching at the desired frequency, maintaining an isolation level smaller than −20 dB, and minimizing the size of the ground plane.

Figure 7A:
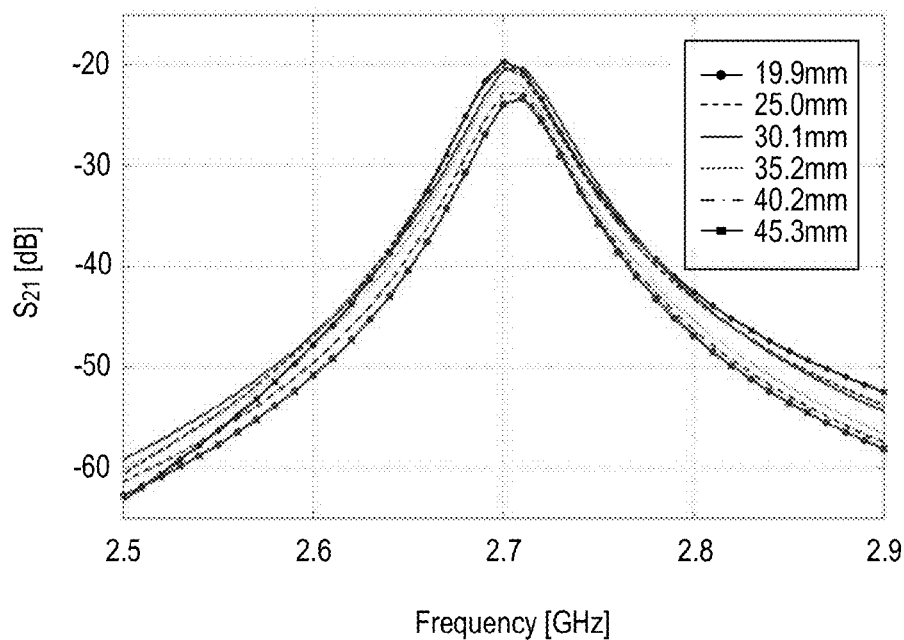
FIGS. 7A and 7B are graphs of the simulated coupling between antennas shown in FIG. 6 with varying distance between antennas and varying ground plane width, respectively.
Figure 7B:
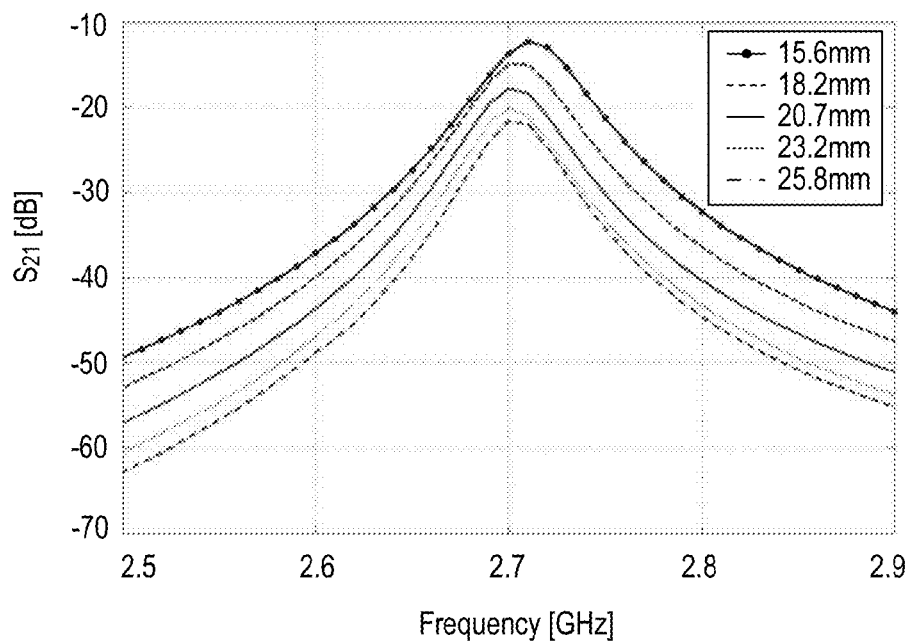

FIG. 7A represents a parametric study where the simulation responses of $S_{21}$ (coupling) between RX and TX antennas are displayed. In this simulation the spacing between the antenna and edges of the ground plane are fixed and the distance between the two antennas, D is varied. As can be seen, the distance between the two antennas does not play a major role in the mutual coupling between the two antennas. This implies that the amount of coupling from surface wave propagation is not affected by the separation distance within the specified range of distances shown in FIG. 7A. However, in choosing the ground plane size the overall dimension of the small radio repeater platform and the space for the channel isolator should be taken into account to avoid any interaction between the two antennas and the channel isolator. The optimized distance between the two antennas is found to be 25 mm. In addition, the width of the ground plane affects the level of mutual coupling due to excitation of edge currents. This effect is shown in FIG. 7B where all other dimensions are fixed (D=25 mm, L=40 mm) and W is changed. To account for the integration of an RF amplifier on the backside, the dimensions of the platform are finally chosen to be 40.01 mm×20.68 mm, which corresponds to $\lambda_0/2.75 \times \lambda_0/5.32$.

Figure 8:
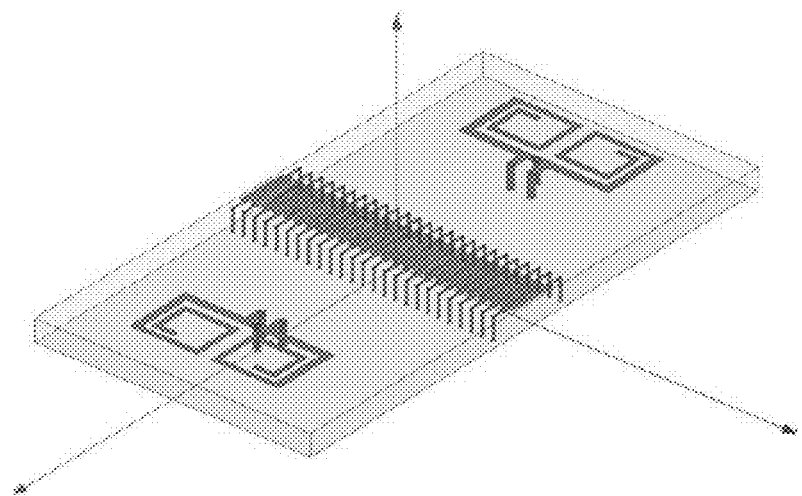
FIG. 8 is a perspective view of the exemplary repeater platform with a channel isolator.

The geometry of the proposed miniaturized radio repeater is composed of two miniaturized low-profile antennas capable of radiating vertical polarization and a meta-material isolator layer as shown in FIG. 8. As mentioned before, close spacing between the antennas and the isolator causes mutual coupling, and therefore it affects the performance of the repeater. Specifically, the antennas input impedances and the resonant frequency of the isolator both change as a result of the placement of the antennas and the isolator. The current distribution on the ground plane is used to evaluate the optimal placement of the isolator. As all of the physical parameters are related to each other through various electromagnetic interactions, optimization is achieved through adjusting the length of the isolator loop and the strip iteratively using HFSS.

As an initial step in the design, the RX and TX antennas as well as the isolator are designed separately. For integration, since multiple resonant structures with sub-wavelength dimensions are used, the use of manual mesh modifications in HFSS is required to capture the details of the fields around the isolator. The designed topology is in FIG. 8. Physical parameters are optimized for the repeater to operate around 2.72 GHz and are reported in the table below.

| Design Parameters | Optimized Dimension |
|---|---|
| Distance between two antennas (D) | 24.99 mm |
| Distance between two vertical wires ($f_{loop}$) | 5.84 mm |
| Length of strip fingers ($f_{cap}$) | 3.38 mm |
| Width of platform (W) | 20.68 mm |
| Length of platform (L) | 40.01 mm |
| Height of platform | 1.57 mm |
| Adjusted Antenna Geometry (see FIG. 3) | |
| $f_{h4}$ | 1.21 mm |
| $f_{v2}$ | 3.80 mm |
| $f_{v3}$ | 3.00 mm |
| $f_m$ | 0.97 mm |

Figure 9:
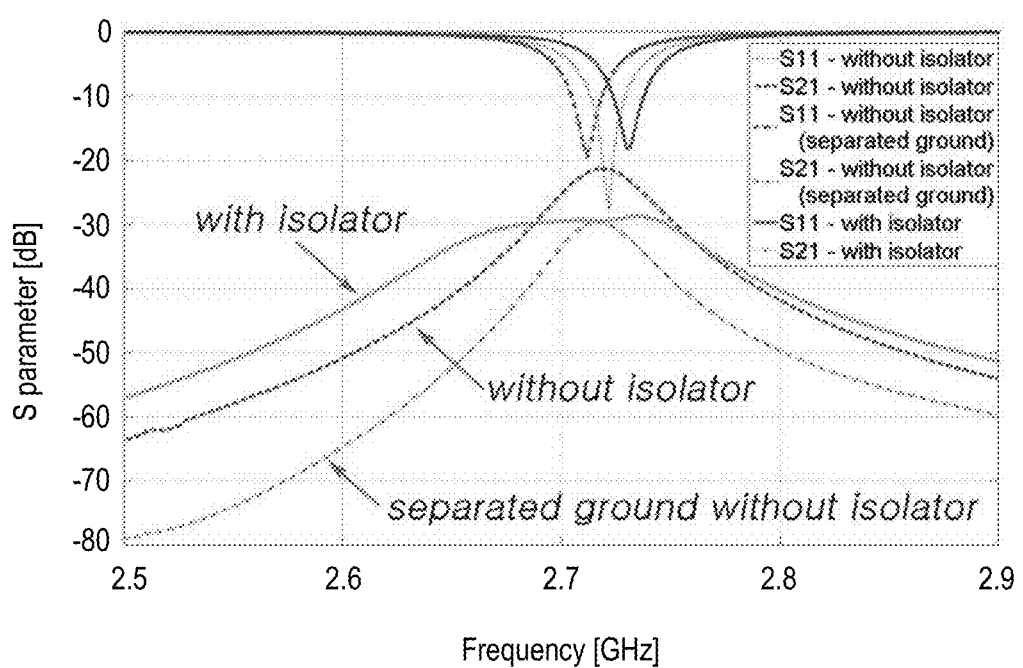
FIG. 9 is a graph illustrating a simulated S-parameter of the exemplary repeater with and without the channel isolator.

FIG. 9 shows the simulated S-parameters of an optimized small radio repeater platform. As shown, a −20 dB of transmission coefficient can be achieved between the TX and RX antennas without the channel isolator with designed dimensions (assuming the two antennas are well matched.) Incorporating the channel isolator, the transmission coefficient drops to −30 dB. Also shown is that the antenna response is affected due to the interaction between the antennas and the isolator. In fact, per our design the antennas are better matched (over −15 dB of input reflection coefficient), and the center frequency is at the desired value in the presence of the isolator. The presence of the antenna also affects the isolator frequency response. As shown before, the resonant frequency of an isolated unit cell of the meta-material isolator is at 2.98 GHz. With some small adjustments, in the presence of the antenna, this resonance occurs at 2.72 GHz as shown in FIG. 9. it should be noted here that if the ground planes of transmit and receive antenna are disconnected improved isolation can be achieved.

Figure 10:
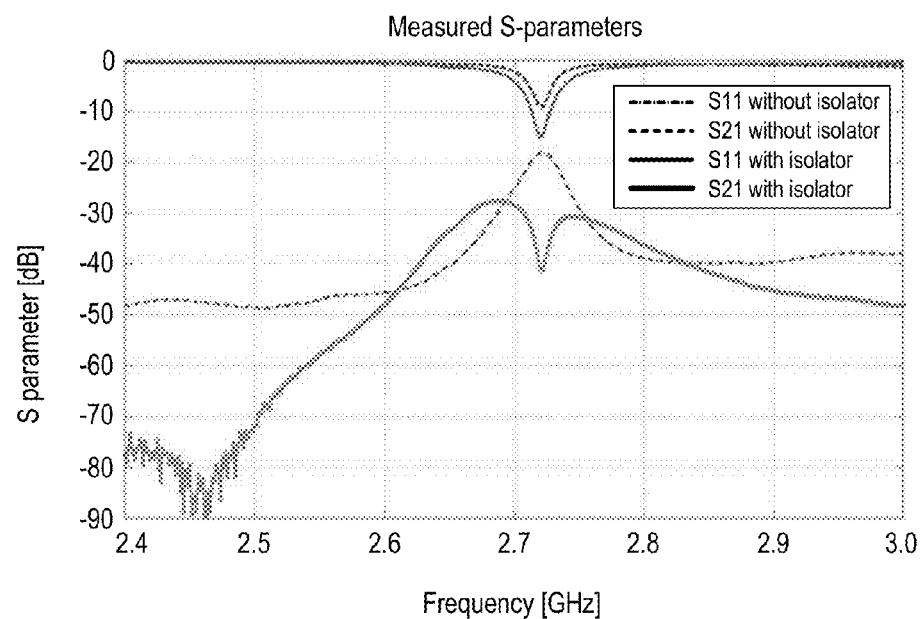
FIG. 10 is a graph illustrating a measured S-parameter from a prototype repeater with and without a channel isolator.

A prototype of the proposed small radio repeater system was fabricated using a 1.5 mm-thick Rogers RO-5880 substrate ($\in_r$=2.2). FIG. 10 shows the measured S-parameters of the small radio repeater and indicates that the resonant frequency is located at 2.72 GHz. Since the fabrication process includes physical limitations such as under cutting of the copper in the etching process and errors in alignment, the frequency shift between the computer based design and actual fabrication is unavoidable. However, this discrepancy can be corrected after a few trials. In addition, post tuning and optimization can be used to obtain the designed performance.

As can be seen, the repeater without the channel isolator shows an $S_{21}$ of −18 dB of transmission coefficient and the proposed repeater shows a −42 dB of transmission coefficient, which indicates 24 dB of suppression improvement. With the channel isolator, −28 dB of peak level of $S_{21}$ is observed, however, in spite of 1 dB of insertion loss from the directional coupler, a maximum gain of 32 dB for a wideband RF amplifier can be utilized with this repeated. Since the antennas are slightly mismatched near to the desired frequency (2.72 GHz), the maximum gain can be higher than the peak level of $S_{21}$. Therefore it is verified that commercial wideband RF amplifier with a gain of 32 dB can be integrated into the proposed repeater without oscillation.

Figure 11:
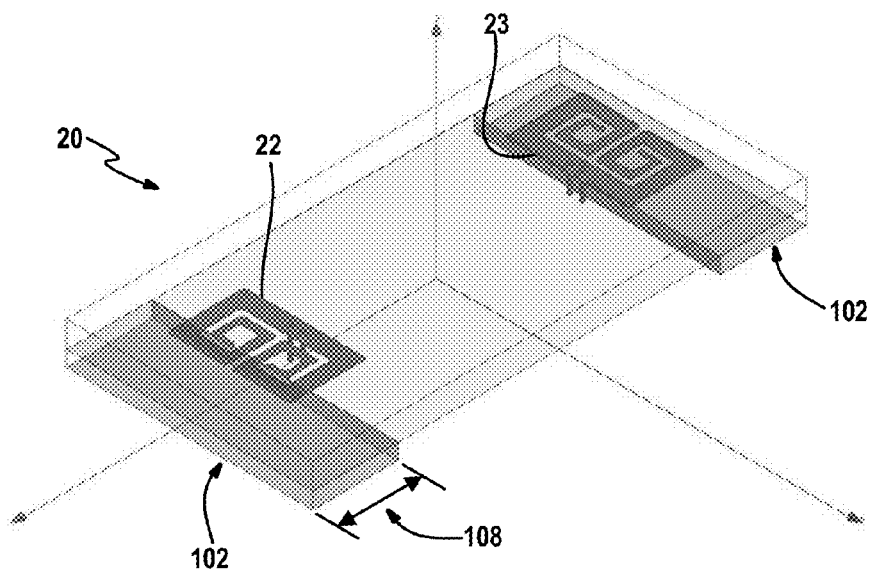
FIG. 11 is a perspective view of an exemplary repeater platform incorporating quarter wavelength electric chokes.
Figure 12:
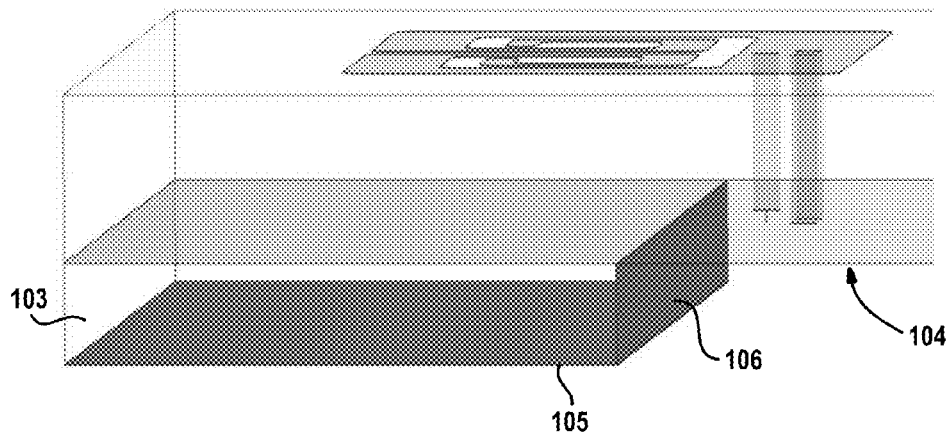
FIG. 12 is a partial side view the exemplary repeater platform.

FIG. 11 illustrate a pair of electric chokes 102 that may be integrated into the radio repeater design. In an exemplary embodiment, the chokes 102 are disposed at opposing ends of an underside surface of the ground plane. With reference to FIG. 12, each choke 102 is comprised of a dielectric material 103 disposed onto the ground plane 104, a lower plane of conducting material 105 layered on top of the dielectric material and a shorting wall 106 of conducting material disposed on a side surface of the dielectric material facing inward towards the other choke and electrically coupling the ground plane 104 to the lower plane 105 of the choke. It is noted that the dimension 108 of the chick aligned with the length of the grounding plane 104 is substantially equal to a quarter of the signal wavelength corresponding to the desired operating frequency of the antennas.

Since the shorting wall generates zero potential difference, the current distribution is maximized at the shorting wall. Therefore, at the desired frequency (2.4 GHz) the current distribution at the open side of the choke is minimized, which means that the input impedance of the choke becomes infinite. Since the induced electric current in confined within the choke, the cross talk between two antennas through the induced current at the back side of the ground plane can be suppressed. In addition, the confinement of the current provides an electrically quiet area between two chokes, which is suitable for integration of amplifier circuitry or other repeater components.

Figure 13:
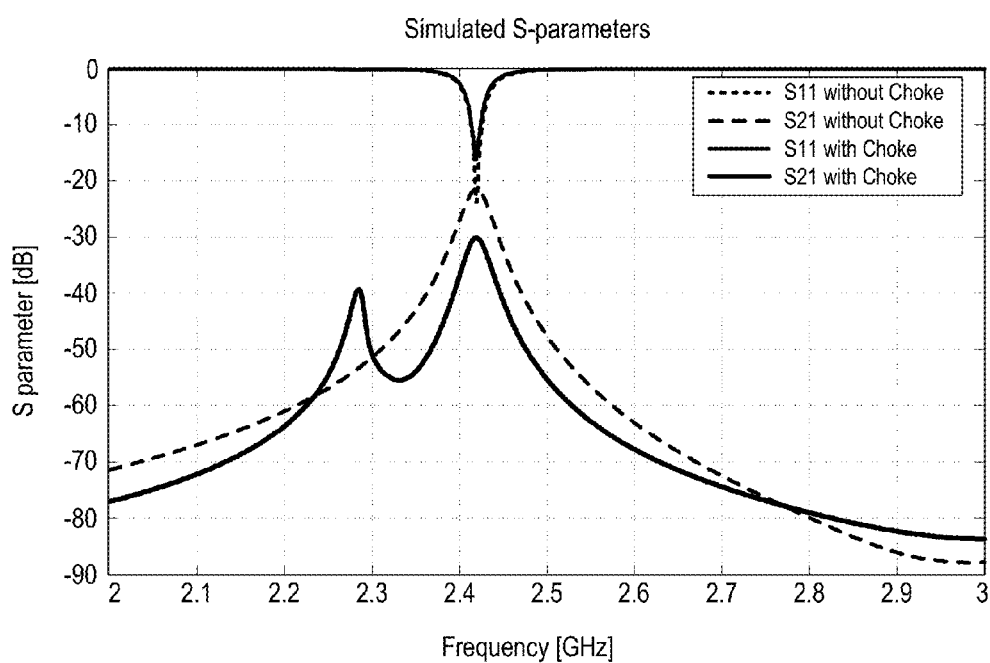
FIG. 13 is a graph illustrating a simulated S-parameter for the exemplary repeater with the quarter wavelength electric chokes.

It was found that fringing E fields as well as the substrate mode and the induced electric current contribute to the mutual coupling between two antennas. For example, the more distance between two antennas reduces the coupling from the substrate mode, the stronger fringing E fields are generated through the back side of the repeater. Therefore, the position of two antennas can be optimized to minimize the S21. FIG. 13 shows the optimized positions of two antennas and its S21 response. Without any other isolators, the mutual coupling between two antennas was reduced to −21 dB at 2.42 GHz. As mentioned, the quarter wavelength choke can suppress the induced electric current at the back side of the ground plane. Its dimensions and positions were optimized, as shown in FIG. 13. Integration of the quarter wavelength choke resulted in the more reduction of S21 from −21 dB to −32 dB at 2.42 GHz. Since the mutual coupling between two antennas (TX and RX) comes from the substrate mode and the induced electric current in the ground plane, the meta-material based EBG isolator 25 and the quarter wavelength electric chokes 102 can be integrated together.

Figure 14:
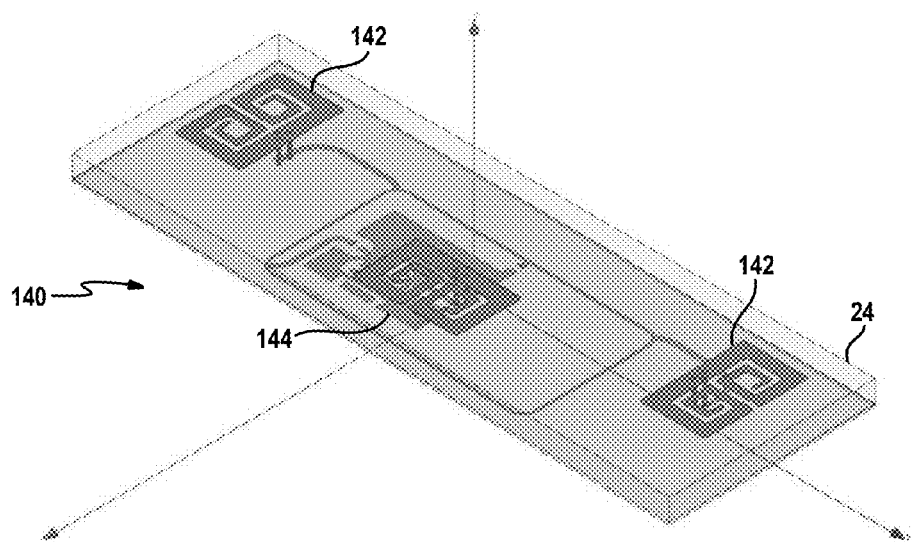
FIG. 14 is a perspective view of another exemplary repeater platform employing a symmetric antenna layout.
Figure 15:
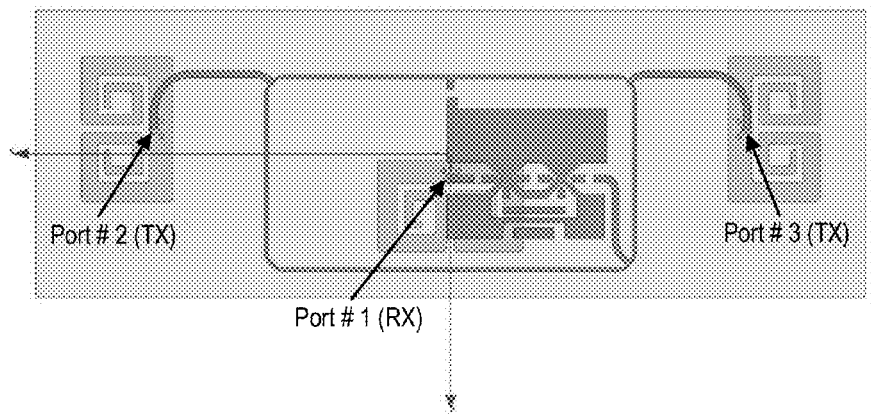
FIG. 15 is a top view of the repeater platform.

In another aspect of the disclosure, a symmetric design for radio repeater can be used to mutually isolate the antennas as shown in FIG. 14. In this design, a pair of transmit antennas 142 are fabricated on the top surface of a substrate 24 at opposing ends thereof and spaced apart from each other at a distance equal to one half of a wavelength of a signal at the desired operating frequency. A receive antenna 144 is also fabricated on the top surface of the substrate 24 and disposed at a location in the middle of the transmit antennas 142. A coupling circuit 146 electrically couples the receive antenna 144 to the pair of transmit antennas 142. In an exemplary embodiment, the antennas have a low profile with vertical polarization similar to those described above although other types of antennas are also contemplated by this disclosure.

Figure 16:
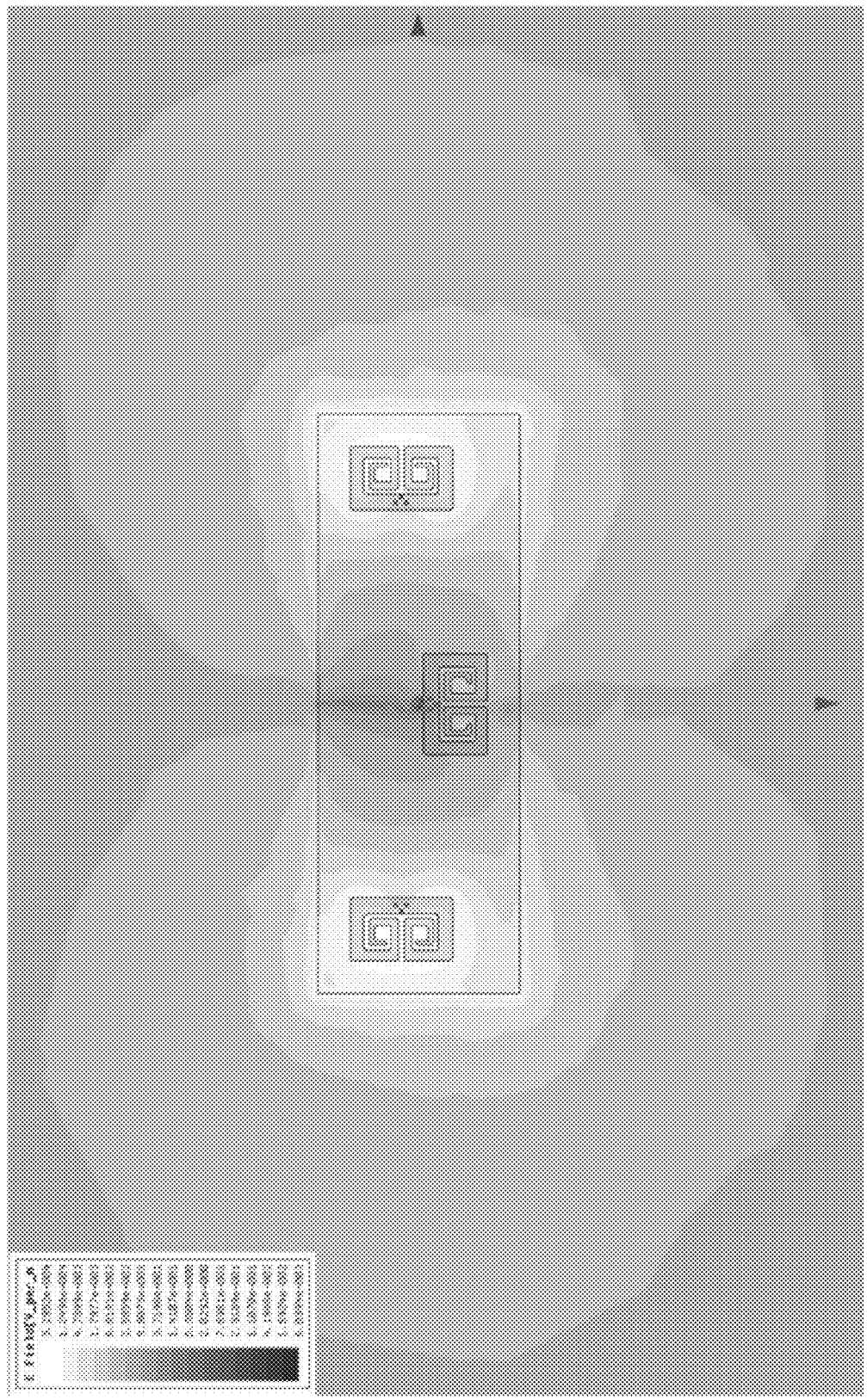
FIG. 16 illustrates the electric field distribution in the xy plane of the repeater platform with the symmetric antenna layout.

In operation, the coupling circuit 146 is configured to receive a signal from the receive antenna 144 and supply a transmit signal to each of the transmit antenna 142 such that the transmit signals having same magnitude but a phase difference of 180 degrees. By applying the same magnitude of signals with 180° out-of-phase simultaneously, electric null plane can be generated at the symmetric plane, which corresponds to the middle of two transmit antennas 142 as shown in FIG. 16. Thus, the subtraction of two identical signals contributes to minimize the S21 dramatically. Any objects in this null plane become independent of the two transmit antennas. In order to generate the signals with same magnitude and 180° phase difference, an optimized Rat-race coupler may be utilized although other types of coupling circuits are contemplated. Thus, the effect of this cancellation is reflected to the power coupling (S parameter) between one TX and RX. It is expected that this method can achieve at least −44 dB of mutual isolation between the transmit antennas and the receive antenna. Accordingly, this symmetric design principle can be implemented independent from the channel isolators.

Figure 17:
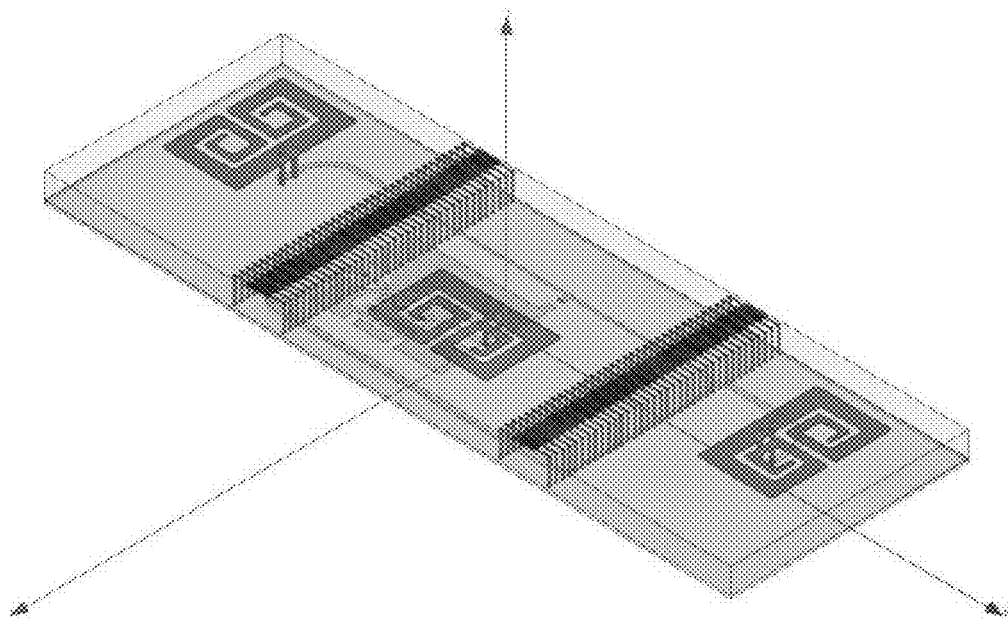
FIG. 17 is perspective view of the exemplary repeater platform integrating channel isolators.

On the other hand, the symmetric design can be implemented in conjunction with the channel isolators as shown in FIG. 17. Because the EBG isolator can suppress the mutual coupling between one transmit antenna and the receive antenna, the S21 can be reduced further with the same effect of cancellation.

In this disclosure, a new concept for implementation of a miniaturized radio repeater is presented. To construct the radio repeater, two miniaturized low-profile antennas ($\lambda_o$/70) radiating vertical polarization and a very thin meta-material isolator layer are integrated into a compact configuration. The antennas are designed to have an omni-directional radiation pattern to make the repeater insensitive to the positions of the transmitter and receiver. In addition, the proposed isolator is shown to suppress the mutual coupling, improving the transmission coefficient from −18 dB to −42 dB. The dimensions of the TX/RX antennas and a unit cell of the isolator are 11.20 mm×5.10 mm×1.57 mm and 5.84 mm×0.81 mm×1.57 mm, respectively. The overall dimensions of the proposed radio repeater are 40.01 mm×20.68 mm×1.57 mm which corresponds to $\lambda_o$/2.75×$\lambda_o$/5.32×$\lambda_o$/70. The proposed radio repeater system has been simulated and verified experimentally. A prototype of the design has been fabricated using printed circuit technology, which serves to reduce the fabrication complexity and allows for easy commercial production at a large scale. Such a radio repeater system can mitigate the adverse effects of obstacles in radio connectivity for ad-hoc networks in complex environments.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A radio repeater, comprising:
   a receive antenna configured to receive a signal at a desired channel frequency
   a transmit antenna configured to transmit the signal at the desired channel frequency;
   an amplifier electrically connected between the receive antenna and the transmit antenna; and
   an array of resonating circuits disposed spatially between the receive antenna and the transmit antenna which are electromagnetically coupled, the array of resonating circuits configured to resonant at the channel frequency, thereby suppressing propagation of magnetic waves between the antennas, wherein the receive antenna, the transmit antenna, the amplifier and the array of resonating circuits are fabricated on a substrate and dimensions of the substrate are less than a wavelength of a signal at the desired channel frequency.

2. The radio repeater of claim 1 wherein the receive antenna and the transmit antenna are further defined as antennas having a low profile with vertical polarization and fabricated on a surface of the substrate.

3. The radio repeater of claim 1 wherein the receive antenna and the transmit antenna are further defined as monopole antennas having a two-arm spiral shape quarter-wave resonator structure.

4. The radio repeater of claim 1 wherein the array of resonating circuits are magnetically coupled to a substrate mode.

5. The radio repeater of claim 1 wherein each resonating circuit is further defined as a parallel LC circuit.

6. The radio repeater of claim 2 wherein each resonating circuit includes an interdigital capacitor disposed on the surface of the substrate and an inductor formed by a pair of conductive pins embedded vertically into the substrate and electrically coupled to different terminals of the capacitor.

7. The radio repeater of claim 1 further comprises a battery for powering components of the radio repeater.

8. A radio repeater, comprising:
   a substrate defining opposing top and bottom surfaces;
   a pair of antennas having a low profile and fabricated on the top surface of the substrate;
   an amplifier electrically connected between the pair of antennas;
   an array of isolating elements integrated into the substrate and disposed spatially between the pair of antennas, wherein the isolating elements operate to suppress propagation of transverse magnetic waves between the pair of antennas;
   a ground plane affixed to the bottom surface of the substrate; and
   a pair of chokes disposed at opposing ends of an underside surface of the ground plane, such that each choke operates to suppress an induced current traversing on the ground plane.

9. The radio repeater of claim 8 wherein each of the antennas is further defined as monopole antenna having a two-arm spiral shape quarter-wave resonator structure.

10. The radio repeater of claim 8 wherein the antennas operate at a desired frequency and each isolating element is defined as a resonating circuit configured to resonant at the frequency.

11. The radio repeater of claim 8 wherein each isolating element is comprised of an interdigital capacitor disposed on a top surface of the substrate and a pair of conductive pins embedded vertically into the substrate, each conductive pin is electrically coupled between a different terminal of the capacitor and the ground plane.

12. The radio repeater of claim 8 wherein each choke is comprised of a dielectric material disposed onto the ground plane, a lower plane of conducting material layered on top of the dielectric material and a shorting wall of conducting material disposed on a side surface of the dielectric material facing inward towards the other choke and electrically coupling the ground plane to the lower plane of the choke.

13. The radio repeater of claim 12 wherein the antennas operate at a desired frequency and each choke having dimension along the length of the grounding plane substantially equal to a quarter of the signal wavelength corresponding to the desired operating frequency of the antennas.

14. A channel isolator for use in an integrated circuit, comprising:
   a substrate defining opposing top and bottom surfaces;
   a pair of antennas having a low profile with vertical polarization and operating at a desired frequency, the pair of antennas fabricated on the top surface of the substrate and each dimension of the substrate is less than a wavelength of a signal at the desired frequency;
   a ground plane affixed to the bottom surface of the substrate; and
   an array of isolating elements integrated into the substrate and disposed spatially between the pair of antennas, each isolating element is comprised of an interdigital capacitor disposed on a top surface of the substrate and an inductor formed by a pair of conductive pins embedded vertically into the substrate, each conductive pin is electrically coupled between a different terminal of the capacitor and the ground plane.

15. The channel isolator of claim 14 wherein the antennas operate at a desired frequency and each isolating element is configured to resonant at the desired frequency.

16. The channel isolator of claim 14 wherein the array of isolating elements generates a magnetic field orientated perpendicular to the top surface of the substrate and perpendicular to a longitudinal dimension of the substrate.

17. A radio repeater, comprising:
   a substrate defining opposing top and bottom surfaces;
   a pair of transmit antennas fabricated on the top surface of the substrate at opposing ends thereof and configured to operate at a desired frequency, the pair of transmit antennas spaced apart from each other at a distance equal to one half of a wavelength of a signal at the desired frequency;
   a receive antenna fabricated on the top surface of the substrate and disposed at a location in middle of the pair of transmit antennas; and
   a coupling circuit electrically coupling the receive antenna to the pair of transmit antennas, the coupling circuit configured to receive a signal from the receive antenna and supply a transmit signal to each of the pair of transmit antenna such that the transmit signals having same magnitude but a phase difference of 180 degrees.

18. The radio repeater of claim 17 wherein the coupling circuit is further defined as a rat-race coupler.

19. The radio repeater of claim 17 wherein the receive antenna and pair of transmit antennas are further defined as monopole antennas having a two-arm spiral shape quarter-wave resonator structure.

20. The radio repeater of claim 17 further comprises a first array of isolating elements integrated into the substrate and disposed between the receive antenna and one of the pair of transmit antennas, and a second array of isolating elements integrated into the substrate and disposed between the receive antenna and the other transmit antenna, wherein the isolating elements operate to suppress propagation of transverse magnetic waves between the antennas.

21. The radio repeater of claim 20 wherein each isolating element is defined as a resonating circuit configured to resonant at the desired frequency.

22. The radio repeater of claim 20 further comprises a ground plane affixed to the bottom surface of the substrate, wherein each isolating element is comprised of an interdigital capacitor disposed on a top surface of the substrate and a pair of conductive pins embedded vertically into the substrate, each conductive pin is electrically coupled between a different terminal of the capacitor and the ground plane.

23. The radio repeater of claim 22 further comprises a pair of chokes disposed at opposing ends of an underside surface of the ground plane, such that each choke operates to suppress an induced current traversing on the ground plane.

* * * * *